United States Patent [19]
Doi et al.

[11] Patent Number: 5,649,269
[45] Date of Patent: Jul. 15, 1997

[54] IMAGE RECORDING APPARATUS HAVING A MASK MEMBER MOVING TOGETHER WITH AN EXPOSURE UNIT

[75] Inventors: Atsuhiro Doi; Hiroyuki Kohda; Kohji Uchida, all of Kanagawa, Japan

[73] Assignee: Fuji Photo Film Co., Ltd., Kanagawa, Japan

[21] Appl. No.: 598,007

[22] Filed: Feb. 7, 1996

[30] Foreign Application Priority Data

Feb. 10, 1995 [JP] Japan .................................. 7-023215
Dec. 22, 1995 [JP] Japan .................................. 7-335260

[51] Int. Cl.[6] .................................................. G03B 27/50
[52] U.S. Cl. .......................... 399/207; 355/37; 355/70; 355/71; 399/178
[58] Field of Search .......................... 355/32, 37, 70, 355/71, 233, 229

[56] References Cited

U.S. PATENT DOCUMENTS

| | | | |
|---|---|---|---|
| 4,095,888 | 6/1978 | Kawazu et al. | 355/229 X |
| 4,954,862 | 9/1990 | Lee et al. | 355/71 X |
| 5,066,974 | 11/1991 | Nakata et al. | 355/71 |
| 5,068,742 | 11/1991 | Oshikoshi et al. | 355/32 X |
| 5,515,136 | 5/1996 | Nishio et al. | 355/37 |

FOREIGN PATENT DOCUMENTS

| | | | |
|---|---|---|---|
| 60-247634 | 12/1985 | Japan | 355/71 |
| 5-181246 | 7/1993 | Japan . | |
| 5-204055 | 8/1993 | Japan | 355/71 |
| 6-161070 | 6/1994 | Japan . | |
| 6-242546 | 9/1994 | Japan . | |
| 6-289555 | 10/1994 | Japan . | |

Primary Examiner—Arthur T. Grimley
Assistant Examiner—Sophia S. Chen
Attorney, Agent, or Firm—Sughrue, Mion, Zinn, Macpeak & Seas

[57] ABSTRACT

An image recording apparatus is designed to decrease the size of an exposure unit, thereby allowing the exposure unit to move within a narrow space between an original document and a photosensitive material, to facilitate color adjustment and density adjustment, to provide a high resolution at low costs, and to prevent light fogging. The exposure unit is moved between a stage and a document table which hold a photosensitive material and an original document, respectively, so as to copy the image of the original document onto the photosensitive material by scanning exposure. An LED light source comprises three groups of light emitting elements which respectively emit blue, green and red colors, and a light beam from the LED light source is irradiated such that the light beam extends in a direction parallel to the original document and perpendicular to the direction of movement of the exposure unit (the forward and backward direction of the stage). The irradiated light is reflected by the original document and is caused to reach to a slit-like area of the photosensitive material through a SELFOC lens for exposure. Further, a mask member is moved together with the exposure unit so as to provide a light shield on both sides off the exposure unit in the direction of movement thereof, thereby preventing light fogging.

15 Claims, 14 Drawing Sheets

F I G. 6
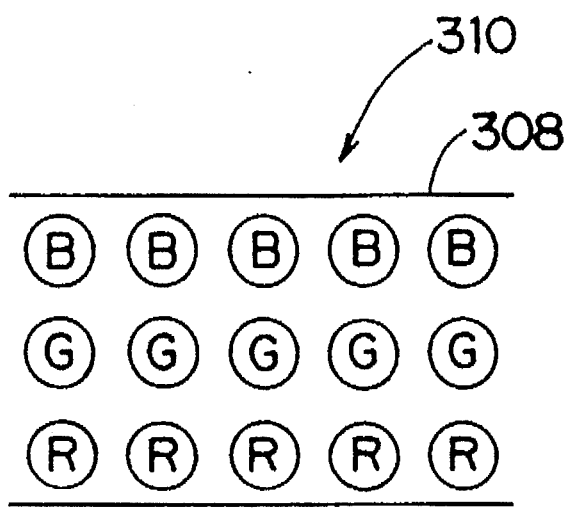

F I G. 7
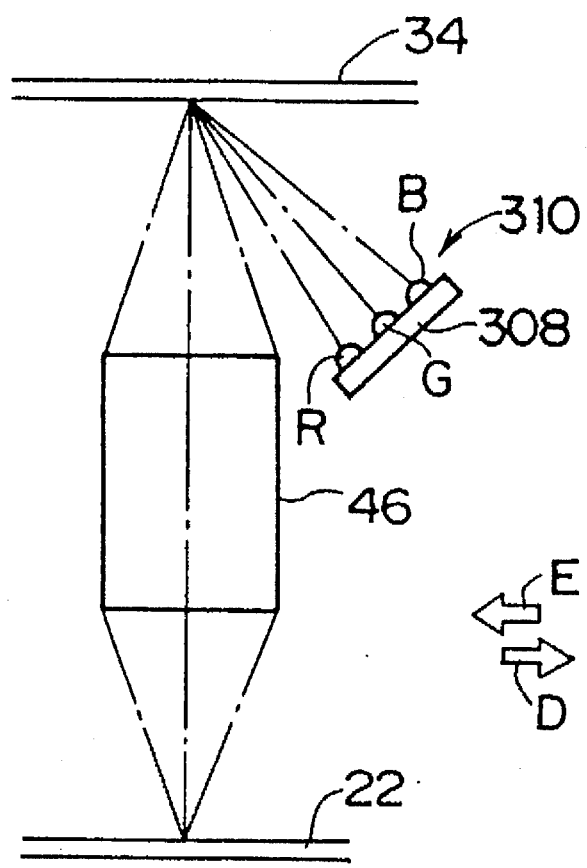

IMAGE RECORDING APPARATUS HAVING A MASK MEMBER MOVING TOGETHER WITH AN EXPOSURE UNIT

BACKGROUND OF THE INVENTION

1. Field of the Invention

The present invention relates to an image recording apparatus in which an image on an original document is copied onto a photosensitive material by exposure, and the photosensitive material and an image receiving material are superposed on each other for heat development/transfer, thereby producing an image on the image receiving material.

2. Description of the Related Art

An image recording apparatus for producing a color image has been known in which an image on an original document is copied onto a photosensitive material by exposure, and an image receiving material is superposed on the photosensitive material to cause the photosensitive material to closely contact the image receiving material for heat development/transfer, thereby producing an image on the image receiving material.

It is well known to dispose an original document and a photosensitive material facing each other, to fixedly provide an optical system as an exposure unit, and to move the original document and the photosensitive material so as to expose the photosensitive material. Also, it is well known to fixedly dispose an original document and a photosensitive material, and to move an optical system in parallel with the original document and the photosensitive material between them. In both cases, a light beam having a slit-like cross section is irradiated from a light source provided in the optical system toward an original document and is reflected by the original document. The light reflected by the original document successively irradiates different portions of the photosensitive material.

In the mechanism in which an original document and a photosensitive material are moved (transported), a highly accurate speed control is required for movements of the original document and the photosensitive material to obtain a high resolution. Further, a highly accurate transport is required to prevent generation of a shift between the original document and the photosensitive material. These requirements increase costs.

Although the mechanism in which the optical system is moved can solve the above-described drawbacks, the size of the optical system must be decreased, because the optical system is moved within a narrow space between the original document and the photosensitive material. However, the necessity of color adjustment and density adjustment makes it difficult to decrease the size of the optical system.

For example, in the case where a halogen lamp is used as a light source, color separation filters for three colors, i.e., C (cyan), M (magenta) and Y (yellow) are necessary, and these Filters increase the size or the apparatus.

An original document is placed on a platen glass, and covered with a document cover. However, when the cover is opened or when the cover is closed in a lifted state, external light enters and causes light fogging of a photosensitive material.

SUMMARY OF THE INVENTION

The present invention has been accomplished in view of the foregoing problems, and an object of the present invention is to provide an image recording apparatus which decreases the size of an exposure unit, thereby allowing the exposure unit to move within a narrow space between an original document and a photosensitive material, which facilitates color adjustment and density adjustment, which provides a high resolution at low costs, and which prevents light fogging.

The present invention provides an image recording apparatus in which an image on an original document is copied onto a photosensitive material by exposure, and the photosensitive material and an image receiving material are superposed on each other for heat development/transfer, thereby obtaining an image on the image receiving material. The image recording apparatus comprises a stage for holding the photosensitive material, a document table for holding a first original document such that the first original document faces the photosensitive material on the stage, an exposure unit having an LED light source and adapted to move between the stage and the document table along them, so that light emitted from the LED light source and reflected by the first original document on the document table is irradiated onto the photosensitive material on the stage, thereby performing scanning exposure, and a mask member adapted to move together with the exposure unit and disposed to be present between the document table and the stage on forward and backward sides of the exposure unit in the direction of movement thereof so as to prevent external light entering through the document table from reaching the stage.

In the image recording apparatus having the above-described structure, the exposure unit is moved between the stage and the document table which hold the photosensitive material and the first original document, respectively, so as to copy the image on the first original document onto the photosensitive material by scanning exposure, An image receiving material is superposed on the exposed photosensitive material for heat development/transfer, thereby producing an image on the image receiving material.

For exposure, an LED light source emits light. Since each of light beams of three colors off blue, green and red, for example, is irradiated in a slit-like pattern, a color image can be obtained without using filters. Therefore, the size of the exposure unit can be decreased.

When light emitting elements for three colors of blue, green and red are arranged, the size of the exposure unit can be further reduced by suitably determining the layout of the light emitting elements. Also, a proper irradiation can be equally obtained for each of blue, green and red, and therefore, generation of unevenness in colors can be prevented.

On the forward and backward sides of the exposure unit in the direction of movement thereof, the mask member prevents external light from reaching the stage through the document table. This makes it possible to prevent light fogging on the photosensitive material on the stage without hindering the scanning exposure by the exposure unit.

Accordingly, the size of the exposure unit can be decreased to allow the exposure unit to move within a narrow space between the original document and the photosensitive material., while facilitating color adjustment and density adjustment. Also, a high resolution can be obtained at low costs, and light fogging can be prevented.

Moreover, the image recording apparatus may have a structure in which a second original document is held on a document holding section, and an image on the second original document is copied onto a photosensitive material on the exposure stage in a state in which the scanning exposure means is retracted from the document table.

With this structure, both scanning exposure and planar exposure can be performed in a common exposure stage. Therefore, both scanning exposure and planar exposure can be realized by using a compact mechanism at low costs.

Although the mask member exists between the document table and the stage to cover the stage during scanning exposure, the mask member is retracted from the document table and the stage during planar exposure to open the document table. This makes it possible to copy the image of the second original document onto the photosensitive material by planar exposure through the document table.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 6 is an illustration showing another layout of light emitting elements of the LED light source;

FIG. 7 is a side view of the LED light source shown in FIG. 6, taken along the direction of movement of the exposure unit;

DESCRIPTION OF THE PREFERRED EMBODIMENTS

An image recording apparatus according to a first embodiment of the present invention will now be described with reference to FIGS. 1 through 3A.

Figure 1:
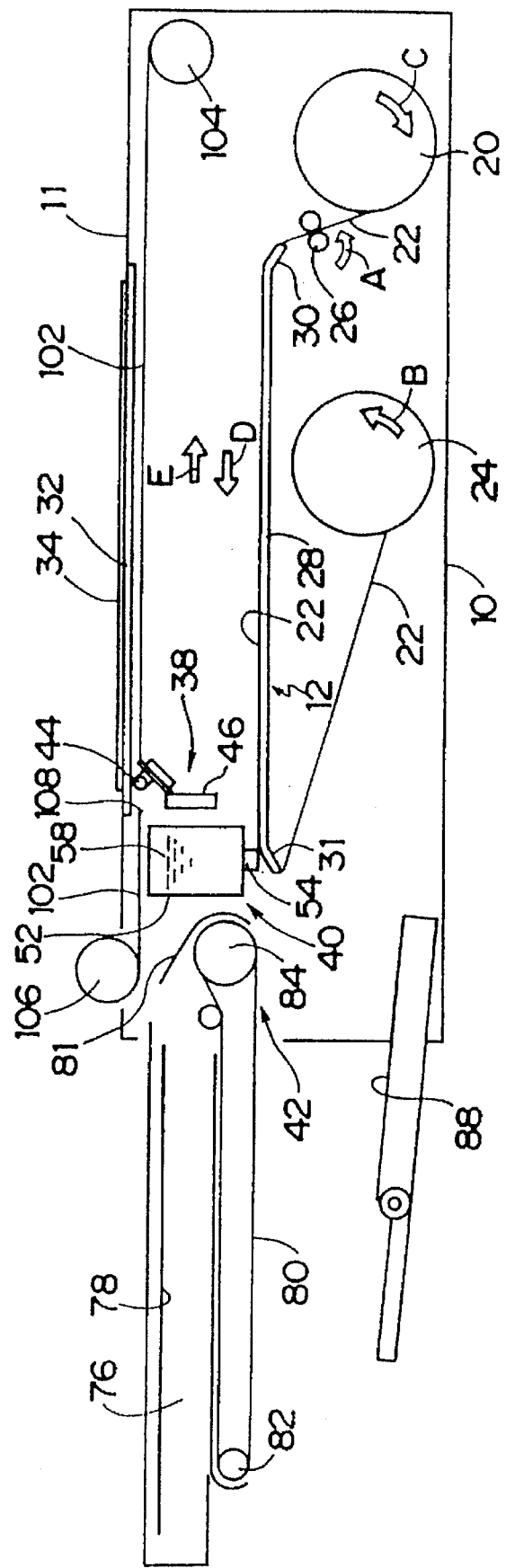
FIG. 1 is a sectional view of an image recording apparatus according to a first embodiment of the present invention, taken along the direction of movement of an exposure unit.
Figure 2:
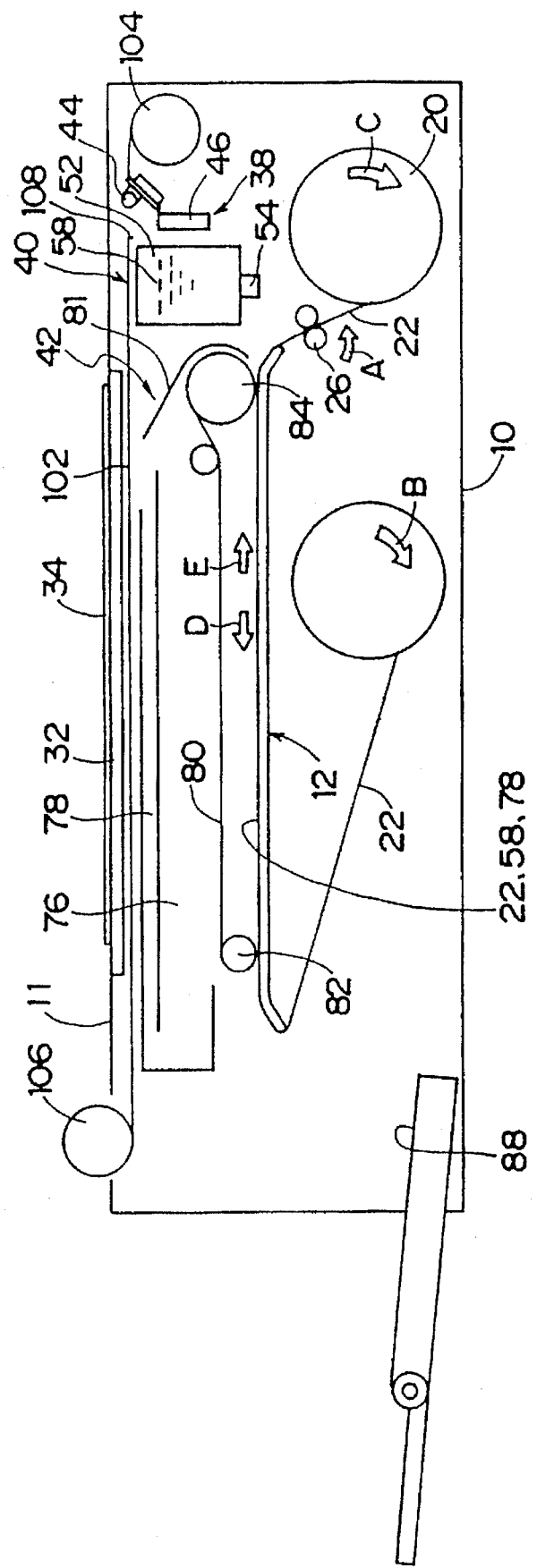
FIG. 2 is a view corresponding to FIG. 1 in the state in which the exposure unit is located at an advanced position.

As shown in FIG. 1, a stage 12 is provided at the central portion inside a cabinet 10. The stage 12 has a flat shape and is horizontally disposed.

A first roller 20 is disposed on the forward-end side of the stage 12 (right-end side in FIG. 1) such that the first roller 20 is situated at a lower position. A heat development photosensitive material (image recording material) 22 serving as a photosensitive material (hereinafter simply referred to as a "photosensitive material 22") is wound by the first roller 20, so that the photosensitive material 22 is stored in a rolled state. The photosensitive material 22 is manufactured by applying a photosensitive silver halide, a binder, a dye-providing material, and a reducing agent onto a support member. When the photosensitive material 22 is pulled out from the first roller 20 and is maintained horizontally on the stage 12, the photosensitive surface of the photosensitive material 22 faces upward.

Under the stage 12, a second roller 24 is provided to be close to the first roller 20. The photosensitive material 22 pulled out of the first roller 20 is run from the front edge to the rear edge (left side edge in FIG. 1) of the stage 12, and is wound by the second roller 24. Nip rollers 26 are disposed between the front edge of the stage 12 and the first roller 20. When the nip roller 26 is driven to rotate in the direction of arrow A and the second roller 24 is driven to rotate in the direction of arrow B, the photosensitive material 22 is pulled out of the first roller 20 as the first roller 20 rotates in the direction of arrow C. Thus, the photosensitive material 22 is moved in the direction of arrow D on the stage 12 (from the front edge to the rear edge of the stage 12), and is pulled and wound by the second roller 24.

With this operation, the photosensitive material 22 can be pulled out from the first roller 20 and then wound by the second roller 24 such that a predetermined length of the photosensitive material 22 is supplied onto the stage 12 at each time.

The stage 12 is provided with a flat portion 28 having a horizontal surface, and slant portions 30 and 31 which are formed at the forward and backward ends of the flat portion 28 and have upper surfaces inclined downward. When exposure is performed, as will be described later, a portion of the photosensitive material 22 having a predetermined length is brought onto the flat portion 28, and is pulled along the slant portions 30 and 31 such that the portion of the photosensitive material 22 having the predetermined length becomes flat along the upper surface of the flat portion 28 without looseness.

A document table 32 is disposed above the stage 12 and is fitted into an upper wall 11 of the cabinet 10 such that the document table 32 faces the stage 12. The document table 32 is made of a transparent plate, and an original document 34 is placed on the document table 32 and is held thereby as a first original document.

Further, an exposure unit 38, an applying unit 40, and a superposing unit 42 are provided. These units 38, 40 and 42 are allowed to Freely move between the document table 32 and the stage 12 in the direction of advancement and retraction of the stage 12. These units 38, 40 and 42 are advanced (arrow E shows the direction of advancing movement) from their stand-by or wait positions (positions shown in FIG. 1), where the units 38, 40 and 42 are successively situated from the rear end of the stage 12 toward the outside, to their advanced positions (positions shown in FIG. 2), where the units 38, 40 and 42 are successively situated from the outside toward the front end of the stage 12. Also, these units 38, 40 and 42 are retracted from the advanced positions to the wait positions (arrow D shows the direction of retracting movement).

The exposure unit 38 includes an LED light source 44, and a SELFOC lens (¼ pitch rod lens) (lens array) 46. In the LED light source 44, LEDs (light emitting diodes) are used to emit blue (B) light, green (G) light and red (R) light. When a predetermined bias current is applied to a crystalline material within an LED, light having a wavelength corresponding to the crystalline material is emitted. Light From the LED light source 44 is irradiated toward the original document 34, such that the beam of light has a cross section which linearly extends in a direction parallel to the original document 34 and perpendicular to the direction of movement of the exposure unit 38 (the forward and backward direction of the stage 12), i.e., the direction perpendicular to the sheet of FIG. 1. The irradiated light is reflected by the original document 34, and the reflected light reaches the photosensitive material 22 via the SELFOC lens 46, so that a slit-like area of the photosensitive material 22 is exposed. When the exposure unit 38 is advanced from the wait position to the advanced position, different portions of the image of the original document 34 are successively copied onto the photosensitive material 22 by scanning exposure.

The LED light source 44 may have the following structure.

Figure 5:
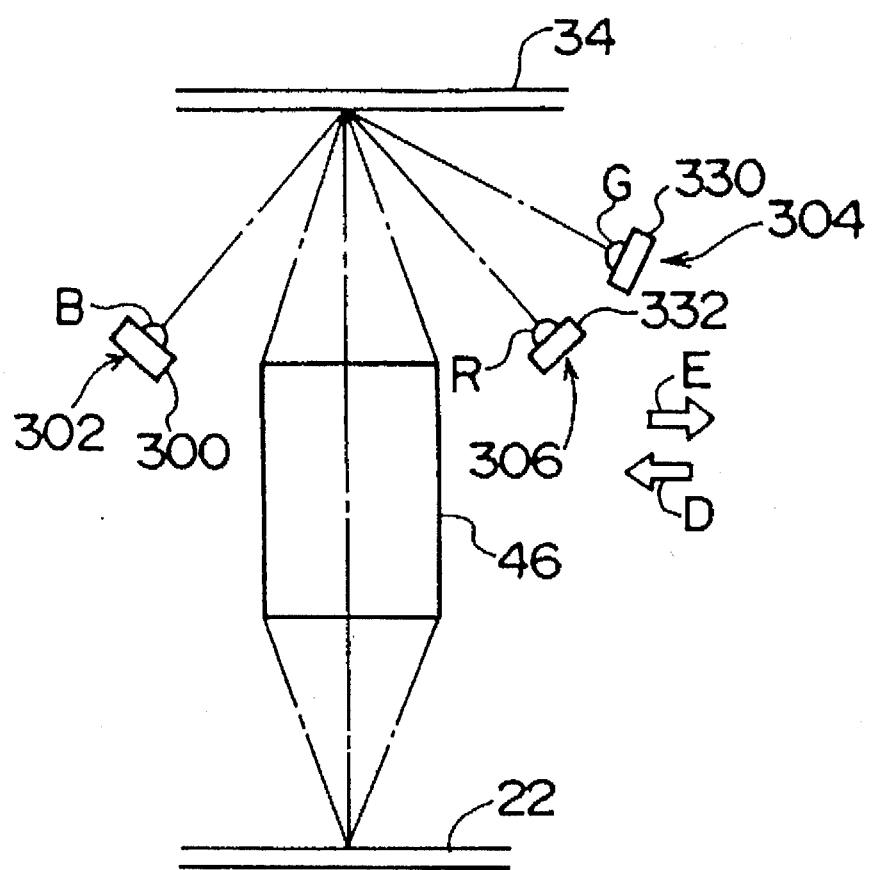
FIG. 5 is a side view of the LED light source shown in FIGS. 4A–4C, taken along the direction of movement of the exposure unit.

For example, as shown in FIGS. 4A, 4B, 4C and 5, a plurality of blue light emitting elements B, a plurality of green light emitting elements G and a plurality of red light emitting element R are disposed on substrates 300, 330 and 332, respectively, such that they are lined in the direction parallel to the original document 34 and perpendicular to the direction of movement of the exposure unit 38, thereby forming LED arrays 302, 304 and 306, respectively. As shown in FIG. 5, the LED array 302 of the blue light emitting elements B and the LED array 306 of the red light emitting elements R are symmetrically disposed with respect to the SELFOC lens 46 in the direction of movement of the exposure unit 38. The LED array 304 of the green light emitting elements G are disposed on the same side as the red light emitting elements R to be located thereabove.

In an LED light source shown in FIGS. 6 and 7, a plurality of blue light emitting elements B, a plurality of green light emitting elements G and a plurality of red light emitting element R are disposed in three lines on a common substrate 308, such that each of the lines extends in the direction parallel to the original document 34 and perpendicular to the direction of movement of the exposure unit 38, thereby forming an LED array 310. The LED array 310 having the above-described layout is disposed on one side of the SELFOC lens 46 in the direction of movement of the exposure unit 38, as shown in FIG. 7.

Figure 8:
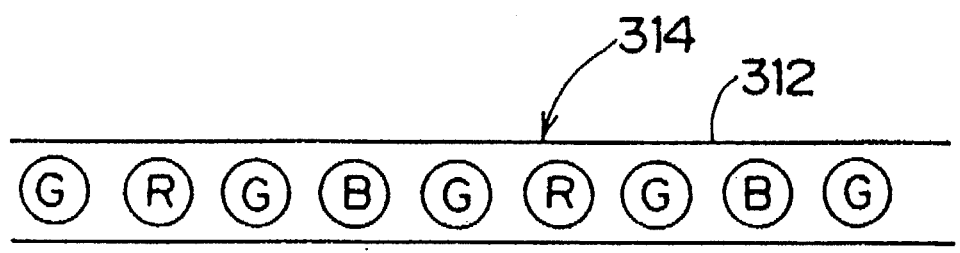
FIG. 8 is an illustration showing yet another layout of light emitting elements of the LED light source.
Figure 9:
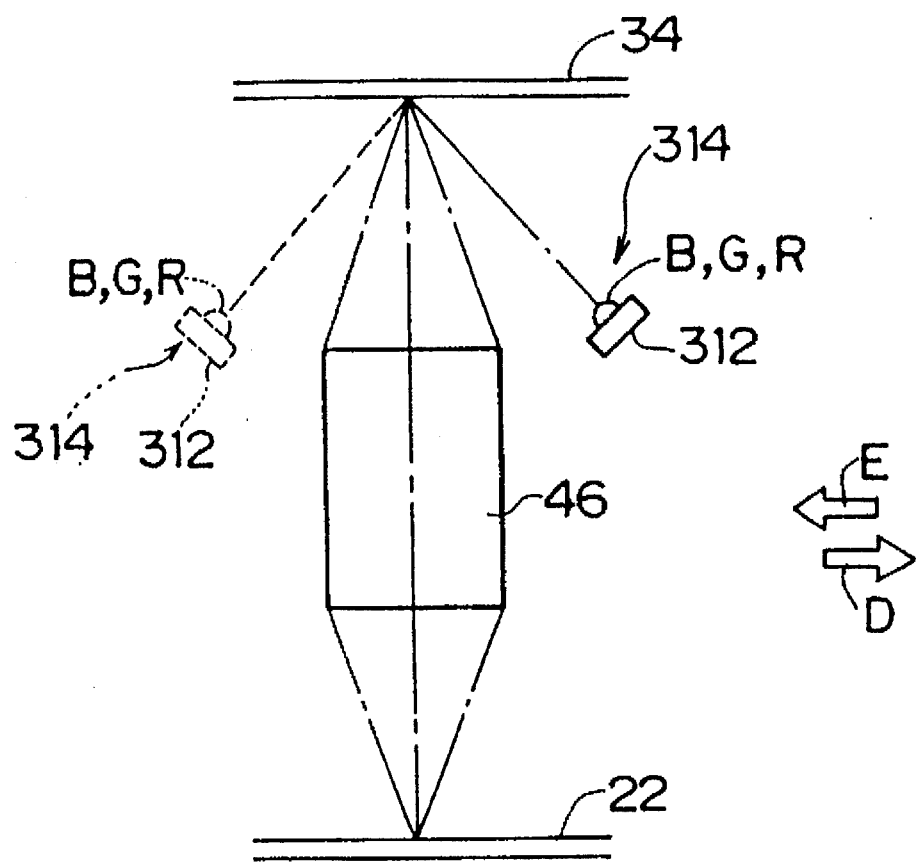
FIG. 9 is a side view of the LED light source shown in FIG. 8, taken along the direction off movement of the exposure unit.

In an LED light source shown in FIGS. 8 and 9, blue light emitting elements B, green light emitting elements G and red light emitting element R are disposed in a single line on a common substrate 312, such that the line extends in the direction parallel to the original document 34 and perpendicular to the direction of movement of the exposure unit 38, thereby forming tin LIED array 314. The LED array 314 having the above-described layout is disposed on one side of the SELFOC lens 46 in the direction of movement of the exposure unit 38, as shown by a solid line in FIG. 9, or is symmetrically disposed on each side thereof, as shown by the solid line and a broken line in FIG. 9. In latter case, more even illumination can be provided. As will be described later, LEDs emit different colors with different luminances depending on their crystalline materials. Therefore, when the luminance of green light emitting elements G is lower than those of red light emitting elements R and blue light emitting elements B, for example, a red light emitting element R and a blue light emitting element B are alternately disposed between every two green light emitting elements G so as to make the number of green light emitting elements G greater than the number of red light emitting elements R and the number of blue light emitting elements B, as shown in FIG. 8. With this arrangement, a uniform luminance can be obtained on the original document 34 for each of red, blue and green, and the amount of light can be adjusted, thereby preventing generation of unevenness in colors and the like.

Figure 10A:
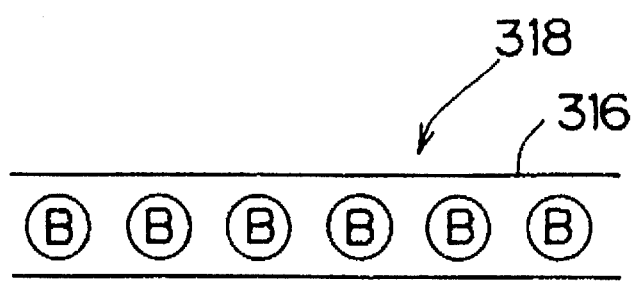
FIGS. 10A and 10B are illustrations showing further layouts of light emitting elements of the LED light source.
Figure 10B:
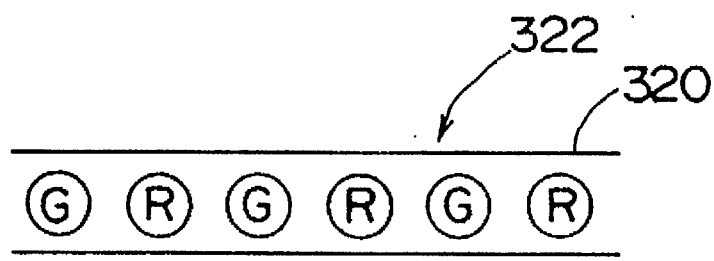
Figure 11:
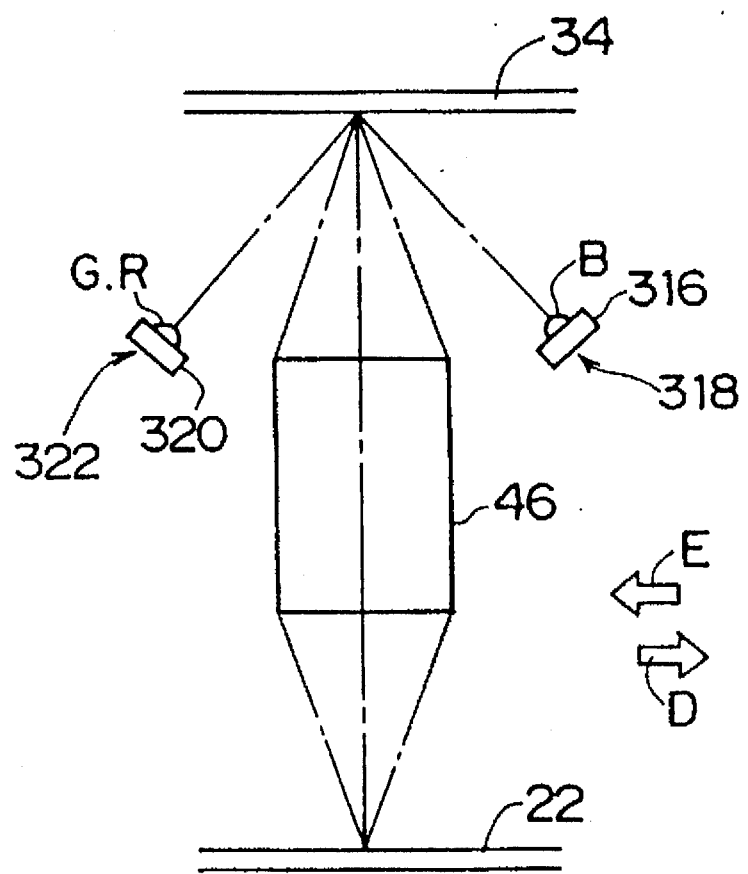
FIG. 11 is a side view of the LED light source shown in FIGS. 10A and 10B, taken along the direction of movement of the exposure unit.

In an LED light source shown in FIGS. 10A, 10B and 11, two LED arrays 318 and 322 are provided. In the LED array 318, blue light emitting elements B are disposed on a substrate 316, such that they are lined in the direction parallel to the original document 34 and perpendicular to the direction of movement of the exposure unit 38. In the LED array 322, green light emitting elements G and blue light emitting elements B are alternately disposed on a substrate 320, which is separated from the substrate 316 of the LED array 318, such that they are lined in the same direction as the direction in which the blue light emitting elements B are lined. These LED arrays 318 and 322 are symmetrically disposed on both sides of the SELFOC lens 46 in the direction of movement of the exposure unit 38, as shown in FIG. 11. Accordingly, the angle of irradiation (the angle between irradiated light and the direction perpendicularly intersecting the surface of an original document) becomes the same for each of the red light emitting elements R, blue light emitting elements B and green light emitting elements G. Therefore, a uniform luminance can be obtained on the original document 34 for each color. Further, since differences are not produced in the irradiation positions of the three colors, generation of unevenness in colors and the like can be prevented. LEDs emit different colors with different luminances depending on their crystalline materials. Therefore, when the luminance of blue light emitting elements B is lower than those of red light emitting elements R and green light emitting elements G, for example, the number of blue light emitting elements B is made greater than the number of red light emitting elements R and the number of green light emitting elements G. With this arrangement, a uniform luminance can be obtained on the original document 34 for each of red, blue and green, and the amount of light can be adjusted, thereby preventing generation of unevenness in colors and the like.

Referring back to FIGS. 1 and 2, the applying unit 40 includes a tank (container) 52, and a sponge (applying portion) 54 which is attached to the bottom of the tank 52. The tank 52 has a rectangular box-like shape extending in the direction parallel to the photosensitive material 22 and perpendicular to the forward and backward direction of the stage 12. The tank 52 is filled with a transfer aiding agent (image forming solvent) such as water 58. The sponge 54 is fixed to the lower surface of a lid, so that the water 58 in the tank 52 is absorbed by the sponge 54 via a communication hole formed in the lower surface of the lid, and is held thereby. The tank 52 is driven by an unillustrated solenoid or the like to move downward and upward. When the tank 52 is moved to its lowered position, the sponge 54 is pressed against the photosensitive material 22, so that the water 58 is applied onto the photosensitive material 22.

The applying unit 40 starts its advance movement after advance movement of the exposure unit 38 has been started. With the advance movement of the applying unit 40 in the state in which the sponge 54 is in contact with the photosensitive material 22, the water 58 is applied over the photosensitive material 22.

The superposing unit 42 has a magazine 76, in which sheets of an image receiving material 78 each having a predetermined length are stacked in parallel with the stage 12. One face of the image receiving material 78 serves as an image forming surface on which a dye fixing material including a mordant has been applied. When the sheets of the image receiving material 78 are stored in the magazine 76, the image forming surface faces upward. Under the magazine 76, an endless belt 80 is wound between rollers 82 and 84. A guide portion 81 is provided at the periphery of the roller 84 which is located near the stage 12 when the superposing unit 42 is located at its wait position.

The superposing unit 42 starts its advance movement after advance movement of the applying unit 40 has been started. When the superposing unit 42 advances, the endless belt 80 reaches the stage 12 and runs on the stage 12 in the clockwise direction in FIG. 1 as the superposing unit 42 advances on the stage 12. With the running of the endless belt 80, a sheet of the image receiving material 78 is pulled out off the magazine 76 by the guide portion 81. The sheet off the image receiving material 78 is reversed, and the leading edge thereof contacts the photosensitive material 22. After that, the sheet of the image receiving material 78 is gradually superposed on the photosensitive material 22 toward the forward end of the stage 12 while being held between the endless belt 80 and the photosensitive material 22.

The stage 12 is heated, and the above-described exposure, application of water, and superposition of the image receiving material are performed in the heated state, whereby heat development/transfer is carried out. In detail, movable dyes of the photosensitive material 22 are released, and the dyes are instantaneously transferred onto the dye fixing layer of the image receiving material 78 to obtain an image on the image receiving material 78.

After the heat development/transfer, the photosensitive material 22 is moved in the direction of arrow D by a predetermined length, so that the photosensitive material 22 is discharged from the rear end of the stage 12 together with the image receiving material.

During this discharge operation, the image receiving material 78 is caused to separate from the photosensitive material 22, and is accumulated in a discharge tray 88.

After the separation, the exposure unit 38, the applying unit 40, and the superposing unit 42 are retracted to the wait positions to wait for a next cycle of exposure, application and superposition.

Figure 3A:
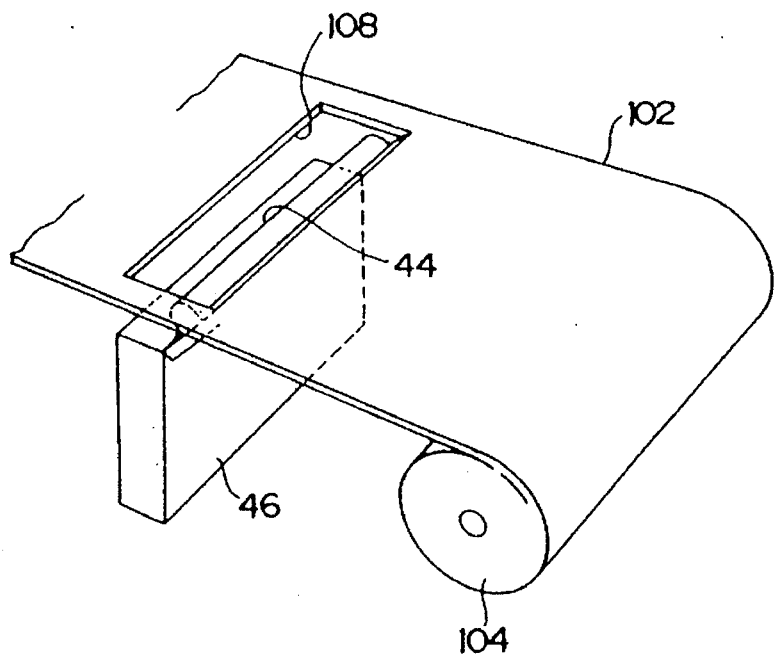
FIG. 3A is a perspective view showing a main portion of the image recording apparatus shown in FIG. 1.

Further, as shown in FIG. 3A, the mask member 102 is provided under the document table 32 such that the mask member 102 extends along the document table 32. The mask member 102 has a flat belt-like shape, and both ends thereof are wound by rollers 104 and 106. An opening 108 is formed in an intermediate portion of the mask member 102 so as to expose the exposure unit 38 through the opening 108. When the exposure unit 38 is moved, the mask member 102 is moved together with the exposure unit 38. For example, when the exposure unit 38 is advanced, one end of the mask member 102 is wound by the roller 104 and the mask member 102 is pulled out from the roller 106. When the exposure unit 38 is retracted, the other end of the mask member 102 is wound by the roller 106 and the mask member 102 is pulled out from the roller 104.

With this operation, external light entering through the document table 32 is prevented from reaching the stage 12 on the forward and backward sides of the exposure unit 38 in the moving direction thereof insofar as the irradiation of light by the light source 44 of the exposure unit 38 and scanning exposure by the SELFOC lens 46 are not hindered by the mask member 102.

With the above-described structure, when the exposure unit 38 is moved between the stage 12 and the document table 32 in the state in which the original document is held by the document table 32 and the photosensitive material 22 is held on the stage 12, the image of the original document 34 is copied onto the photosensitive material 22 by scanning exposure. After the exposure, the image receiving material 78 is superposed on the photosensitive material 22, and is subjected to heat development/transfer to obtain an image on the image receiving member 78.

During exposure, the LED light source 44 irradiates light beams for three colors of blue, green and red. Therefore, a color image can be obtained with no filters, so that the size of the exposure unit 38 can be decreased.

Also, since external light entering through the document table 32 is prevented from reaching the stage 12 on the forward and backward sides of the exposure unit 38 by the mask member 102, light fogging on the photosensitive material 22 on the stage 12 can be prevented without hindering scanning exposure by the exposure unit 38.

Even when a document cover (not shown) is provided to cover the original document 34 on the document table 32, the photosensitive material 22 suffers light fogging when the document cover is opened or when the document cover is closed in a lifted state. In the present embodiment, the mask member 102 prevents light fogging of the photosensitive material 22.

Accordingly, the size of the exposure unit 38 can be reduced to allow the exposure unit 38 to move within a narrow space between the original document 34 and the photosensitive material 22. Further, color adjustment and density adjustment can be facilitated, and a high resolution can be provided at low costs. In addition, light fogging can be prevented.

When an array or arrays of light emitting elements B, G and R for blue, green and red are employed, the size of the exposure unit 38 can be further decreased by properly determining the layout of the light emitting elements. Also, proper irradiation can be equally obtained in each of blue, green and red so as to prevent generation of unevenness in colors.

In the above-described embodiment, the photosensitive material 22 is stored in a rolled state and is pulled out by a predetermined length at each time the photosensitive material 22 is to be supplied. However, the photosensitive material 22 is not limited thereto, and may be cut sheets. Although the image receiving material 78 is in the form of cut sheets in the above-described embodiment, the image receiving material 78 may be stored in a rolled state, pulled out by a predetermined length at each time, and then cut. In the case where the rolled photosensitive material 22 is pulled out for supply, the diameter of the roll of the photosensitive material 22 varies. However, this variation affects neither the distance between the photosensitive material on the stage 12 and the exposure unit 38 nor the distance between the photosensitive material 22 and the image receiving material 78. Therefore, these distances are maintained constant to maintain a high exposure accuracy.

In the above-described embodiment, the mask member 102 has a flat belt-like shape, and is wound by or pulled out from the rollers 104 and 106 as the exposure unit 38 moves.

Figure 3B:
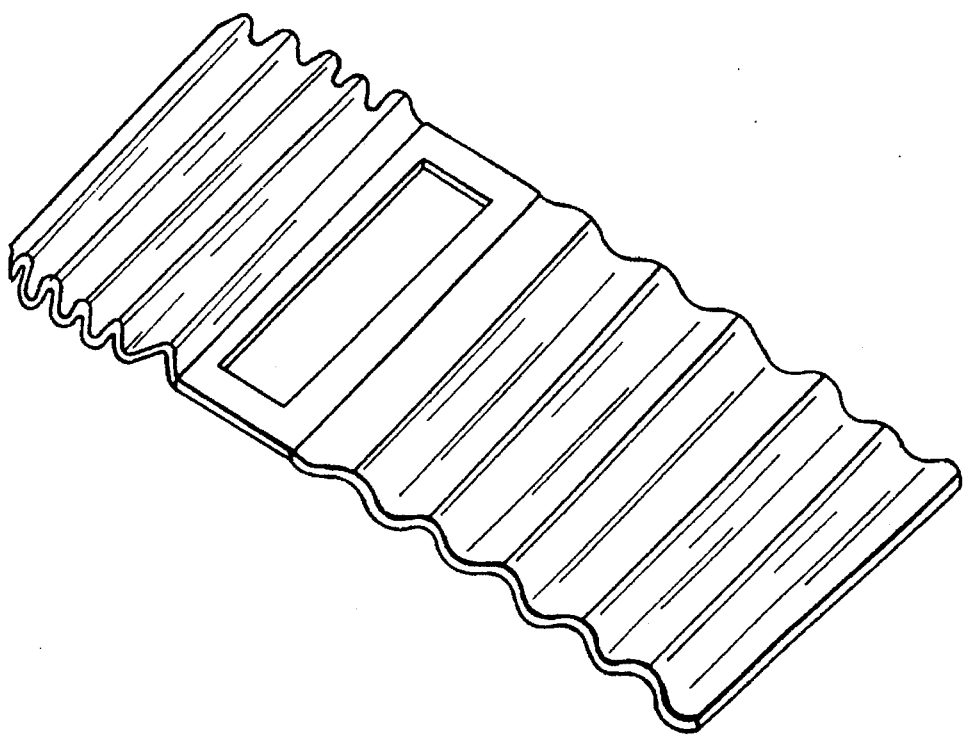
FIG. 3B is a fragmentary perspective view showing an alternative embodiment of the mask member.
Figure 4A:
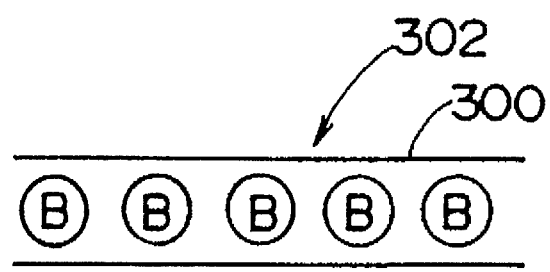
FIGS. 4A, 4B, and 4C are illustrations showing layouts of light emitting elements of an LED light source.
Figure 4B:
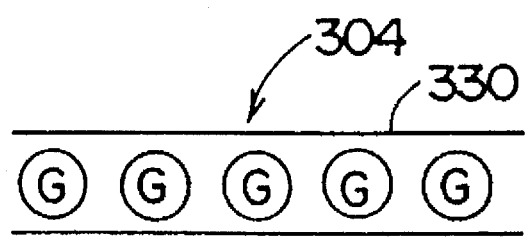
Figure 4C:
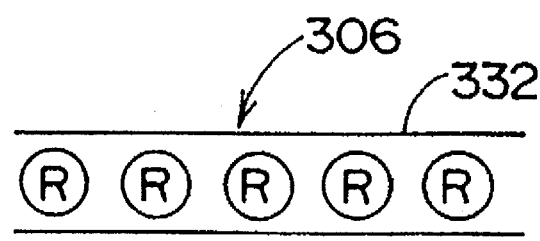

However, the mask member 102 is not limited thereto, and may have a bellows like shape as shown in FIG. 3B, or other shape.

In the above-described embodiment, the size of the apparatus is further decreased by performing, at a common stage, exposure for the photosensitive material 22, application of water 58 onto the photosensitive material 22, superposition of the image receiving material 78 on the photosensitive material 78, and heat development/transfer. However, it is of course possible to perform these processes at separate stages.

Figure 12:
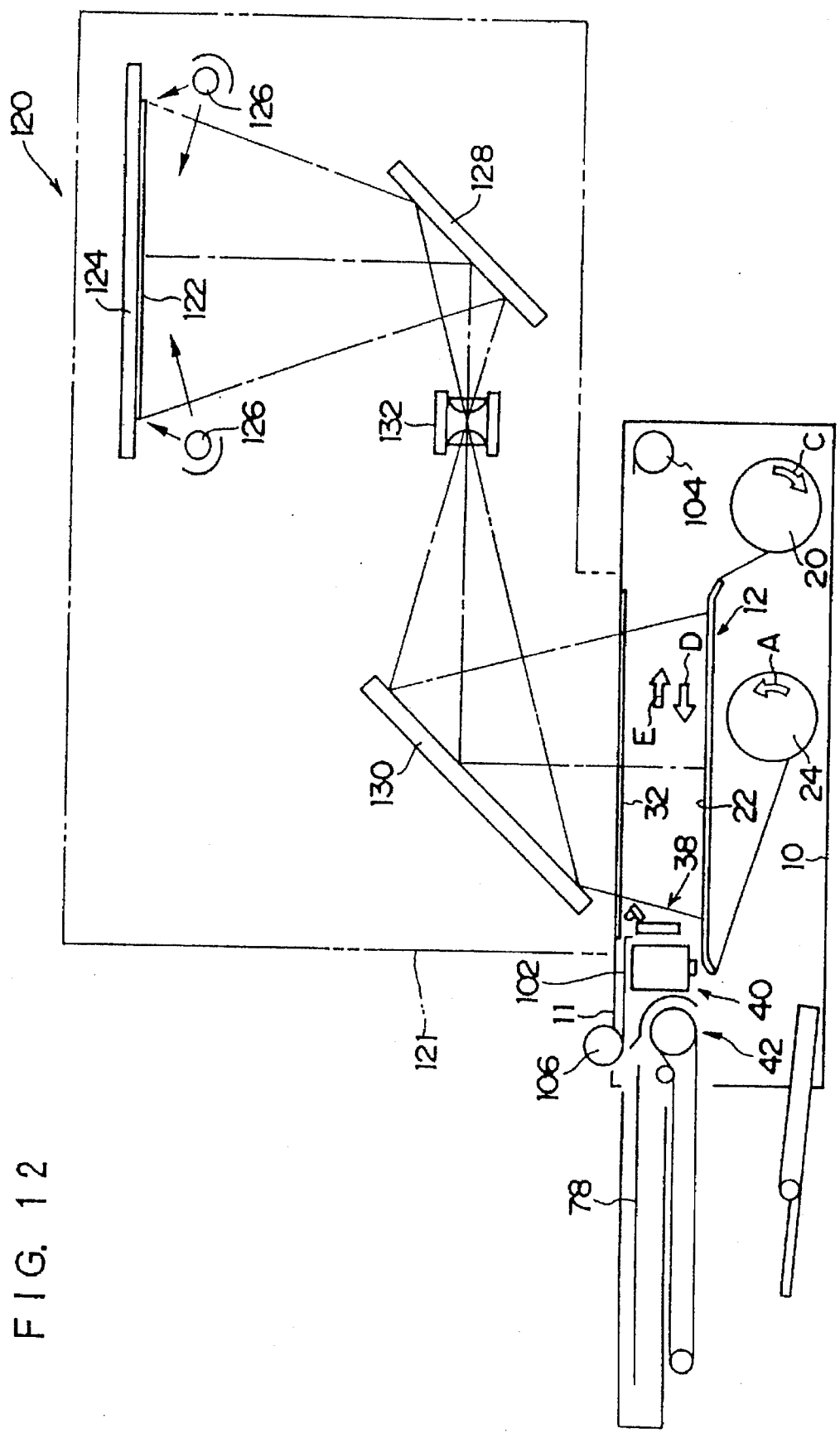
FIG. 12 is a sectional view of an image recording apparatus according to a second embodiment of the present invention, taken along the direction of movement of the exposure unit.

Next, a second embodiment of the present invention will be described with reference to FIG. 12.

In the second embodiment, planar exposure means 120 is removably mounted on the document table 32. The planar exposure means 120 has a housing 121, which is mounted on the upper wall 11 of the cabinet 10 to face the stage 12. Provided in the housing 121 are an original document holding section 124 for horizontally holding an original document 122 as a second original document, light sources 126 situated tinder both opposite ends of the original document 122, mirrors 128 and 130, and a lens unit 132 situated between the mirrors 128 and 130. The light source 126, the mirrors 128 and 130, and the lens 132 form an optical system.

When the planar exposure means 120 is attached, no document 34 exists on the document table 32, and the exposure unit 38, the applying unit 40, and the superposing unit 42 are located at their wait positions (the retracted positions where these units do not hinder planar exposure). Light from the light sources 126 is irradiated over the entire surface of the original document 122, and is reflected by the original document 122. The direction of propagation of the reflected light which propagates downward is changed to a horizontal direction by the mirror 128, so that the reflected light passes through the lens 132 and reaches the mirror 130. The direction of propagation of the reflected light is further changed to a downward direction by the mirror 130, so that the reflected light passes through the document table 32 and reaches the photosensitive material 22 on the stage 12 for planar exposure.

When the planar exposure means 120 is not attached, an original document 34 is held by the document table 32, as has been described in the first embodiment, and scanning exposure is performed by moving the exposure unit 38.

When planar exposure is performed, the exposure unit 38 is located at the wait position, and a portion of the mask member 102 located on the side of the roller 104 with respect to the exposure unit 38 (the portion facing the document table 32) is completely wound by the roller 104. That is, the mask member 102 is retracted from the space between the document table 32 and the stage 12, so that it is open.

With the above-described structure, scanning exposure and planar exposure can be performed in a common exposure stage, and the scanning exposure and the planar exposure can be realized by a compact mechanism at low costs.

When the original document 34 can be held on the document table 32 in the state in which the planar exposure means 120 is attached, it is not necessary for the planar exposure means 120 to be detachable.

Other structures, operation and effects of the apparatus of this embodiment are the same as those of the first embodiment.

Figure 13:
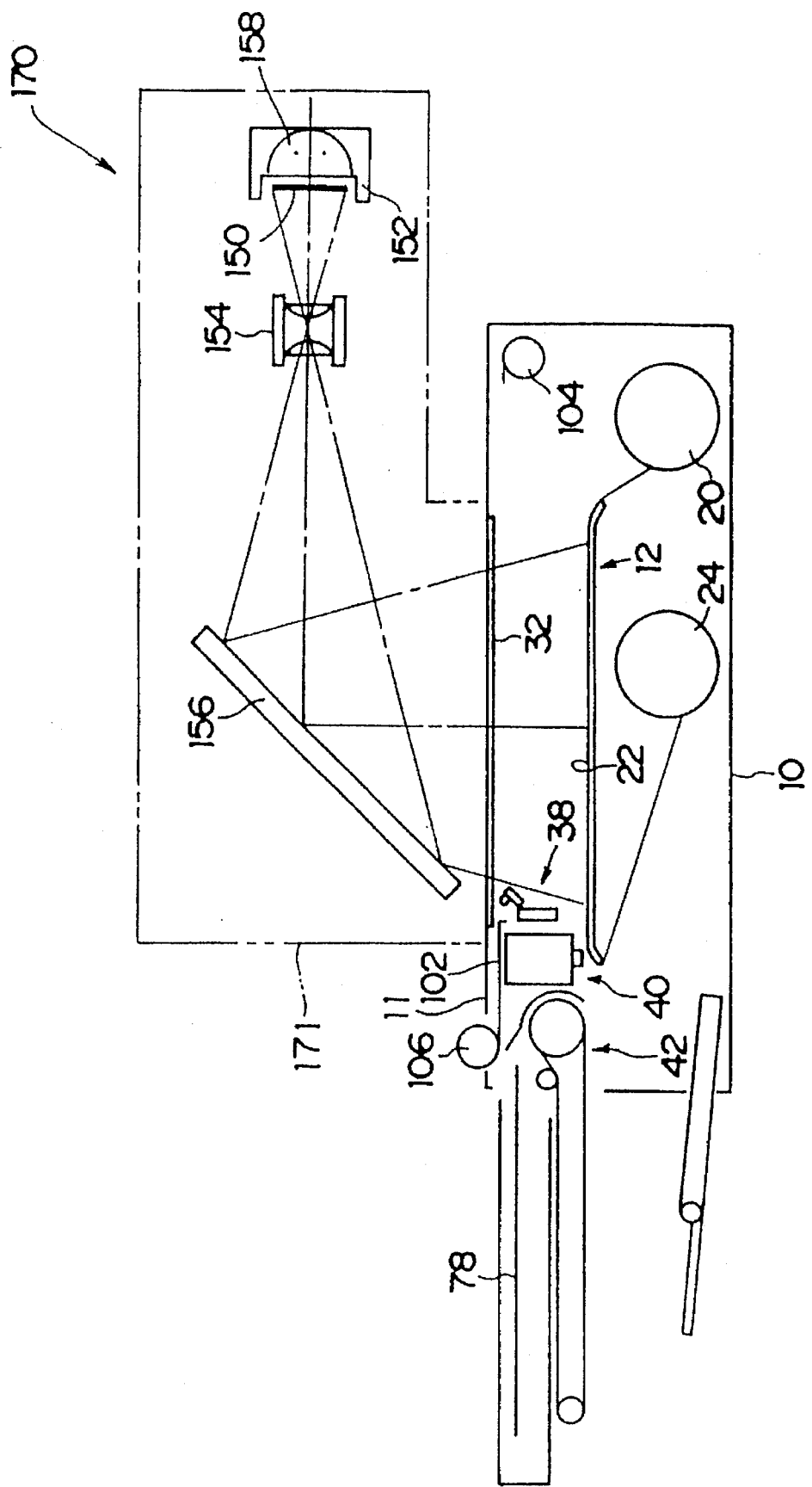
FIG. 13 is a sectional view of an image recording apparatus according to a third embodiment of the present invention, taken along the direction of movement of the exposure unit.

Next, a third embodiment of the present invention will be described with reference to FIG. 13, in which another type of planar exposure means is employed. As shown in FIG. 13, a housing 171 of planar exposure means 170 is provided on the upper surface 11 of the cabinet 10, as in the second embodiment, such that the housing 171 faces the stage 12. A light source 158, an original document holding section 152, a lens 154, and a mirror 156 are provided inside the housing 171. The document holding section 152 vertically holds an original document 150 as a second original document, and light from the light source 158 is irradiated over the entire surface of the document 150. The irradiated light horizontally passes through the original document 150 and the lens 154, and is reflected by the mirror 156, so that the direction of propagation of the light is changed from the horizontal direction to a downward direction. The light then passes through the document table 32 and reaches the photosensitive material 22 on the stage 12, thereby performing planar exposure.

Other structures, operation and effects of the apparatus of this embodiment are the same as those of the second embodiment.

Figure 14:
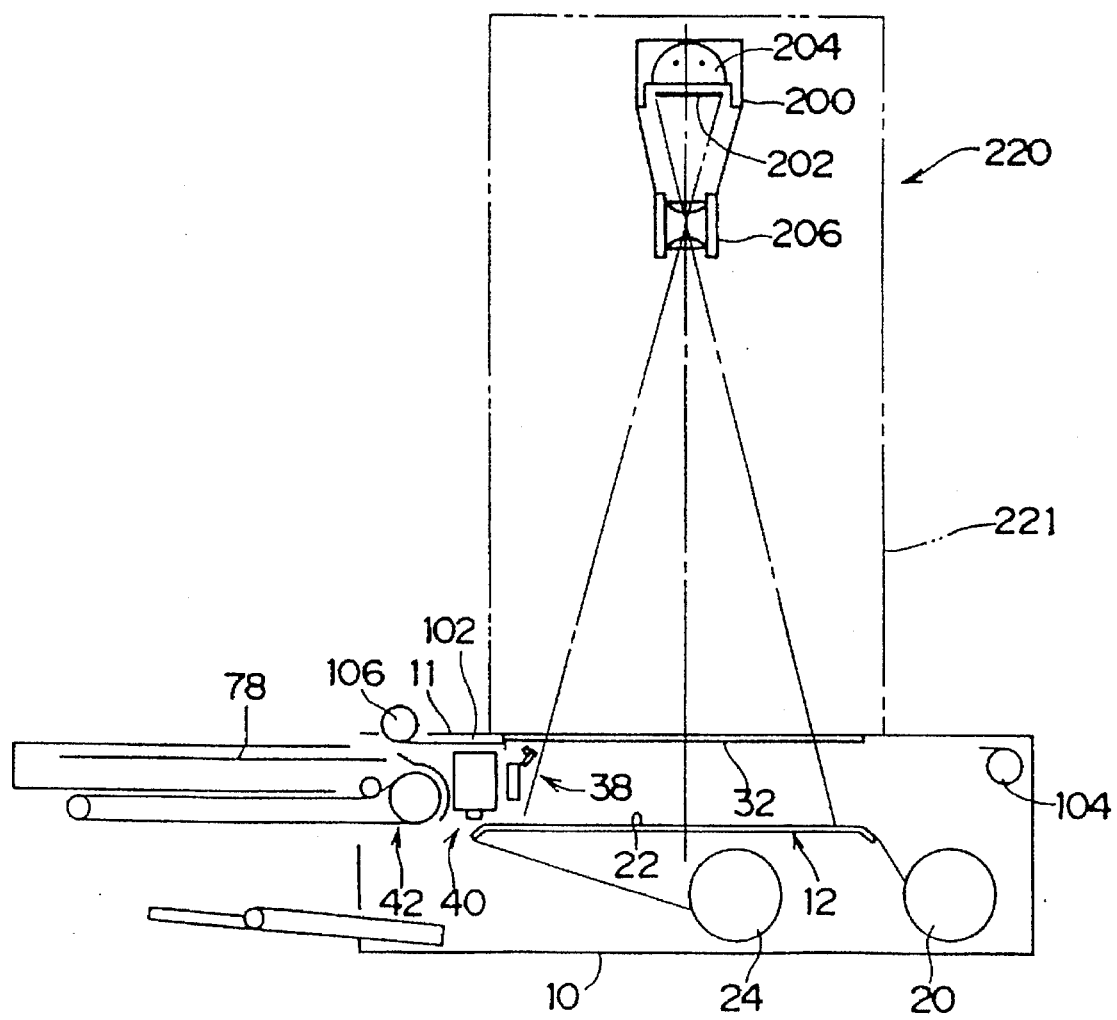
FIG. 14 is a sectional view of an image recording apparatus according to a fourth embodiment of the present invention, taken along the direction of movement of the exposure unit.

Next, a fourth embodiment of the present invention will be described with reference to FIG. 14, in which still another type of planar exposure means is employed. As shown in FIG. 14, a housing 221 of planar exposure means 220 is provided on the upper surface 11 of the cabinet 10, as in the second embodiment, such that the housing 221 faces the stage 12. A light source 204, an original document holding section 200, and a lens 206 are provided within the housing 221. The document holding section 200 horizontally holds an original document 202 as a second original document, and light from the light source 204 is irradiated over the entire surface of the original document in the direction toward the stage 12. The irradiated light vertically passes through the original document 202 and then the lens 206. Subsequently, the light passes through the document table 32 and reaches the photosensitive material 22 on the stage 12, thereby performing planar exposure.

Other structures, operation and effects of the apparatus of this embodiment are the same as those of the second embodiment.

The original document 122 used for the planar exposure means 120 according to the second embodiment is reflective, whereas the original documents 150 and 202 used for the planar exposure means 170 and 220 according to the third and fourth embodiments are transparent. In the latter case, the original documents may be a positive type or a negative type.

In the planar exposure means 120 according to the second embodiment, the image of the original document 122 is copied onto the photosensitive material 22 by planar exposure without enlargement or reduction. In contrast, in the planar exposure means 170 and 220 according to the third and fourth embodiments, the Images of the original documents 150 and 202 are copied onto the photosensitive material 22 by planar exposure with enlargement or reduction.

An example of the photosensitive material used in the image recording apparatus according to the present invention includes a so-called heat development photosensitive material (the photosensitive material 22 used in the above-described embodiments), wherein a latent image obtained in the photosensitive material by image forming exposure is transferred to an image receiving material by heat development/transfer in the presence of an image forming solvent.

The heat development photosensitive material basically contains a photosensitive silver halide, a reducing agent, a binder, and a dye-providing compound (in some cases, the reducing agent also severs as the dye-providing compound). In addition, an oxidizing agent of an organic metal salt may be added, if necessary.

The heat development photosensitive material may produce a negative image or a positive image by exposure. To produce a positive image, it is possible to use a method in which a positive emulsion is directly used as a silver halide emulsion, or a method which utilizes a dye-providing compound to discharge a diffusible dye image as a positive image. The former method includes a method using a nucleating agent, and a light fogging method.

Examples of the heat development photosensitive material which produces a positive image are disclosed in JP-A-6-161070 and JP-A-6-289555, for example. Examples of the heat development photosensitive material which produces a negative image are disclosed in JP-A-5-181246 and JP-A-6-242546, for example.

An example of the image forming solvent used in the present invention includes water. The term "water" is not limited to pure water, and covers water containing some impurities which is generally used. The image forming solvent may be a mixed solvent of pure water and a solvent having a low boiling point such as methanol, DMF, acetone or diisobuthylketone. Moreover, a solution which contains an image formation accelerator, an antifoggant, a development stopping agent, a hydrophiric thermal solvent and the like may be used.

As described above, in the image recording apparatus according to the present invention, the size of the exposure unit can be decreased, and therefore, the exposure unit can be moved within a narrow space between the original document and the photosensitive material. Also, color adjustment and density adjustment can be facilitated, while providing a high resolution at low costs. Moreover, light fogging can be prevented.

In addition, scanning exposure and planar exposure can be performed in a common exposure stage, and both the scanning exposure and the planar exposure can be realized by a compact mechanism at low costs.

While the embodiments of the present invention, as herein disclosed, constitute a preferred form, it is to be understood that other forms might be adopted.

What is claimed is:

1. An image recording apparatus in which an image on an original document is copied onto a photosensitive material by exposure, and the photosensitive material and an image receiving material are superposed on each other for heat development/transfer, thereby obtaining an image on the image receiving material, said image recording apparatus comprising:

a stage for holding the photosensitive material;

a document table for holding a first original document such that the first original document faces the photosensitive material on said stage;

an exposure unit having an LED light source and operative to move between said stage and said document table along them, so that light emitted from the LED light source and reflected by the first original document on said document table is irradiated onto the photosensitive material on said stage for scanning exposure;

a mask member operative to move together with said exposure unit and disposed to be present between said document table and said stage on forward and backward sides of said exposure unit in the direction of movement thereof so as to prevent external light entering through said document table from reaching said stage; and a superposing unit operative to move between said stage and said document table along them so as to superpose the image receiving material onto the photosensitive material.

2. An image recording apparatus according to claim 1, wherein said LED light source comprises blue light emitting elements, green light emitting elements, and red light emitting elements, which are linearly lined in a direction parallel to said document table and perpendicular to the direction of movement of said exposure unit.

3. An image recording apparatus according to claim 1, wherein said exposure unit further comprises a SELFOC lens for causing light, irradiated from said LED light source and reflected by the first original document on said document table, to irradiate the photosensitive material on said stage for scanning exposure.

4. An image recording apparatus according to claim 1, further comprising:

an applying unit operative to move between said stage and said document table along them so as to apply an image forming solvent onto the photosensitive material.

5. An image recording apparatus according to claim 1, wherein said mask member has a flat belt-like shape, anti has an opening at an intermediate portion to expose said exposure unit therethrough, and said opening is operative to move with movement of said exposure unit.

6. An image recording apparatus according to claim 1, wherein said mask member has a bellows-like shape, and has an opening at an intermediate portion to expose said exposure unit therethrough, and said opening is operative to move with movement of said exposure unit.

7. An image recording apparatus according to claim 1, further comprising:

planar exposure member provided at the outside of said document table, said planar exposure member having an original document holding section for holding a second original document such that the second original document faces the photosensitive material held on said stage, and adapted to copy an image on the second original document held by said original document holding section onto the photosensitive material by planar exposure in a state in which said exposure unit is retracted from said document table.

8. An image recording apparatus according to claim 7, wherein said mask member Is retracted from the space between said document table and said stage during planar exposure.

9. An image recording apparatus in which an image on an original document is copied onto a photosensitive material by exposure, and the photosensitive material and an image receiving material are superposed on each other for heat development/transfer, thereby obtaining an image on the image receiving material, said image recording apparatus comprising:

a stage for holding the photosensitive material;

a document table for holding a first original document such that the first original document faces the photosensitive material on said stage;

an exposure unit having an LED light source and a SELFOC lens and operative to move between said stage and said document table along them, so that light emitted from the LED light source and reflected by the first original document on said document table is irradiated onto the photosensitive material on said stage for scanning exposure, said LED light source comprising blue light emitting elements, green light emitting elements, and red light emitting elements, which are linearly lined in a direction parallel to said document table and perpendicular to the direction of movement of said exposure unit, and said SELFOC lens causing light, irradiated from said LED light source and reflected by the first original document on said document table, to irradiate the photosensitive material on said stage for scanning exposure;

a mask member operative to move together with said exposure unit and disposed to be present between said document table and said stage on forward and backward sides of said exposure unit in the direction of movement thereof so as to prevent external light entering through said document table from reaching said stage; and a superposing unit operative to move between said stage and said document table along them so as to superpose the image receiving material onto the photosensitive material.

10. An image recording apparatus according to claim 9, further comprising:

an applying unit operative to move between said stage and said document table along them so as to apply an image forming solvent onto the photosensitive material.

11. An image recording apparatus according to claim 9, wherein said mask member has a flat belt-like shape, and has an opening at an intermediate portion to expose said exposure unit therethrough, and said opening is operative to move with movement of said exposure unit.

12. An image recording apparatus according to claim 9, wherein said mask member has a bellows-like shape, and has an opening at an intermediate portion to expose said exposure unit therethrough, and said opening is operative to move with movement of said exposure unit.

13. An image recording apparatus in which an image on an original document is copied onto a photosensitive material by exposure, and the photosensitive material and an image receiving material are superposed on each other for heat development/transfer, thereby obtaining an image on the image receiving material, said image recording apparatus comprising:

a stage for holding the photosensitive material;

a document table for holding a first original document such that the first original document faces the photosensitive material on said stage;

an exposure unit having an LED light source and a SELFOC lens and operative to move between said stage and said document table along them, so that light emitted from the LED light source and reflected by the first original document on said document table is irradiated onto the photosensitive material on said stage for scanning exposure, said LED light source comprising blue light emitting elements, green light emitting elements, and red light emitting elements, which are linearly lined in a direction parallel to said document table and perpendicular to the direction of movement of said exposure unit, and said SELFOC lens causing light, irradiated from said LED light source and reflected by the first original document on said document table, to irradiate the photosensitive material on said stage for scanning exposure;

an applying unit operative to move between said stage and said document table along them so as to apply an image forming solvent onto the photosensitive material;

a superposing unit operative to move between said stage and said document table along them so as to superpose the image receiving material onto the photosensitive material; and a mask member operative to move together with said exposure unit and disposed to be present between said document table and said stage on forward and backward sides of said exposure unit in the direction of movement thereof so as to prevent external light entering through said document table from reaching said stage.

14. An image recording apparatus according to claim 13, wherein said mask member has a flat belt-like shape, and has an opening at an intermediate portion to expose said exposure unit therethrough, and said opening is operative to move with movement of said exposure unit.

15. An image recording apparatus according to claim 13, wherein said mask member has a bellows-like shape, and has an opening at an intermediate portion to expose said exposure unit therethrough, and said opening is operative to move with movement of said exposure unit.

* * * * *